United States Patent [19]

Takahashi et al.

[11] Patent Number: 4,817,067
[45] Date of Patent: Mar. 28, 1989

[54] OPTICAL RECORDING MEDIUM

[75] Inventors: Shunzo Takahashi; Masaaki Nishioka, both of Tokyo, Japan

[73] Assignee: CSK Corporation, Tokyo, Japan

[21] Appl. No.: 7,014

[22] Filed: Jan. 27, 1987

[30] Foreign Application Priority Data

Jan. 27, 1986 [JP] Japan .................................. 61-15305
Jan. 27, 1986 [JP] Japan .................................. 61-15306

[51] Int. Cl.⁴ ................................................ G11B 7/00
[52] U.S. Cl. ......................................... 369/44; 369/32
[58] Field of Search ..................... 369/44, 45, 46, 100, 369/275, 32; 360/2; 235/454, 456, 470, 487; 353/27 A

[56] References Cited

U.S. PATENT DOCUMENTS

| 4,145,758 | 3/1979 | Drexler et al. |
|---|---|---|
| 4,179,743 | 12/1979 | Suzuki et al. ...................... 353/27 A |
| 4,237,375 | 12/1980 | Granholm .......................... 235/487 |
| 4,254,329 | 3/1981 | Gokey et al. ...................... 235/454 |
| 4,269,917 | 5/1981 | Drexler et al. |
| 4,270,043 | 5/1981 | Baxter et al. ..................... 235/487 |
| 4,278,756 | 7/1981 | Bouldin et al. |
| 4,278,758 | 7/1981 | Drexler et al. |
| 4,360,728 | 11/1982 | Drexler . |
| 4,430,563 | 2/1984 | Harrington ........................ 235/487 |
| 4,486,870 | 12/1984 | Pettigrew et al. ................. 369/32 |
| 4,500,777 | 2/1985 | Drexler . |
| 4,542,288 | 9/1985 | Drexler . |
| 4,544,835 | 10/1985 | Drexler . |
| 4,598,196 | 7/1986 | Pierce et al. |
| 4,598,393 | 7/1986 | Pierce et al. |
| 4,695,991 | 9/1987 | Hudson ............................... 369/44 |

Primary Examiner—Donald McElheny, Jr.
Attorney, Agent, or Firm—Lowe Price LeBlanc Becker & Shur

[57] ABSTRACT

An optical recording medium which is capable of easily effecting a tracking operation in the writing/reading for an optical recording medium of a type in which a plurality of data record tracks and provided, in a recording region of the medium, so as to be disposed side by side and spaced from each other at predetermined intervals. The optical recording medium of the present invention comprising at least one home position setting mark for setting a reference position for each of the data record tracks so that the writing/reading of data may be carried out by using the home position setting mark as a reference. The home position setting mark may have track position marks at positions corresponding to the respective data record tracks for indicating the positions of the respective data record tracks. At least two tracking position indicative marks may further be spacedly provided on an extension of each of the data record tracks or a line parallel therewith for indicating an effective tracking position for each of the data record tracks.

10 Claims, 5 Drawing Sheets

TRACK POSITION INDICATING MARK

OPTICAL RECORDING MEDIUM

FIELD OF THE INVENTION

This invention relates to an optical recording medium having a plurality of data record tracks provided in its recording range or region, at predetermined intervals, and more particularly to an optical recording medium which is capable of facilitating data track access and tracking procedures for read/write operations.

RELATED ARTS

Heretofore, there have been known data storing media in which informations to be stored is written so that the data may correspond to changes of optical states of the storing medium and the changes of the optical states are provided at predetermined intervals. These data storing media includes an optical recording medium, which has attracted considerable attention recently as a carriable, high-density, data recording medium and a replacement for IC cards.

As the optical recording media, there can be mentioned, for example, an optical recording medium which contains minute pits formed on its reflection surface for recording digital signals by utilizing a difference in reflectivities caused by the pits; an optical recording medium which has light and dark patterns on the reflection surface or the transmission surface to record the digital signals; and an optical recording medium which is equipped with polarized light patterns to record digital signals. In any of the media as described above, the data recorded in the optical recording media is read out by irradiating a laser beam or other optical beam onto the media to detect optical changes in the reflected or the transmitted light caused due to the changes in reflectivity and polarized light. These changes are converted into digital signals to read the digital information which has been recorded.

These optical recording media allow a great deal of information to be recorded at extremely high density. Consequently, even an optical recording medium which is configured as a card can have a memory capacity which is more extensive than current IC cards, and therefore it can be utilized for applications such as personal medical treatment data recording, or the recording of dictionaries, etc. These applications have not been accomplished so far by IC cards because of their inherent memory capacity insufficiencies.

However, it is essentially for this type of optical recording media to be able to effect accessing easily to acquire necessary information in a short period of time since the volume of recorded data is extensive. In the case of the media, which are capable of being written in, a writing head must be able to be set at any designated writing position rapidly, and it is again essential that this access can be performed rapidly.

To access a target data track, the read/write head is first set at its initial position to then use this particular position as a reference and detect the object track. This initial position setting is performed with comparative ease, in the case of a disc-type recording medium, since the read/write head may be just positioned at the outermost circumference of the disc.

Whereas, in the case of the optical recording media in which a plurality of data record tracks are juxtaposed in the recording region at predetermined intervals, i.e., non-revolving type optical recording medium, the end of any data record track may be used as a reference position. However, the major disadvantages are that the reference data record track cannot be detected easily and cannot be accessed quickly.

Alternatively, additional data may be preliminarily to written rapidly identify a target track out of the arrangements of multiple data recording tracks.

However, this method has the disadvantage that the detection time increases to read and decide the data written in the particular track by the read head. Thus, in order to read the appropriate object data, the actual read operation must be performed after completing the adjustment of the tracking. Thereafter, the verification of the object data must be carried out, which further increases the detection time.

This invention is made to obviate the previously described disadvantages. It is therefore an object of the present invention to provide an optical recording medium which is capable, in the accessing of the data record tracks, of facilitating the setting of the initial position of the read/write head for the data record tracks, shortening address time by enabling rapid movement to the desired position of the data record track, and performing these operations easily.

SUMMARY OF THE INVENTION

The present invention features an optical recording medium of a type having a plurality of data record tracks juxtaposed, within a recording region of the medium, keeping a predetermined spacing between the respective tracks, which medium comprises at least one home position setting mark for setting a reference position for each of the data record tracks, so that data writing/reading may be carried out, using said home position setting mark as a reference.

In the optical recording medium as described above, the home position setting mark may have track position marks, which are provided at positions corresponding to the respective data record tracks, for indicating the positions of the data record tracks, respectively. With this arrangement, random access operations can be easily performed.

In the optical recording medium as described above, the home position setting mark may be disposed so as to extend in a direction perpendicular to the respective data record tracks, and it may further comprise at least two tracking position indication marks which are indicative of an effective tracking position for the respective data record track, which are spacedly provided on an extension of the respective data record track or a line parallel therewith. In this case, the tracking conditions can be easily detected.

In the optical recording medium as described above, the home position setting mark may be disposed so as to extend in a direction perpendicular to the respective data record tracks, and it may further comprise at least two tracking position indication marks indicative of an effective tracking position for the respective data record track, which are spacedly provided on each of extension of the respective data record tracks or a line parallel therewith and track position marks indicative of the positions of the tracks, which are provided on said home position setting mark at positions corresponding to the respective data record tracks.

Furthermore, the optical recording medium of the present invention may include clock mark lines each having clock marks arranged at predetermined intervals, which are provided adjacent the respective data record tracks so as to extend therealong. The home position setting mark may be referenced to the respective clock mark lines. Track position marks indicative of the positions of the tracks may be provided on the home position setting mark at positions corresponding to the respective clock mark lines. The tracking position indication marks may be provided at the opposite ends of the respective clock mark lines.

The previously described home position setting mark can generally be a belt-like strip disposed near the outside of a starting point or an end point of each data record track. Normally, one is provided only outside of a beginning point or an end point may suffice, but both may be provided.

The tracking position indication marks may be provided on either the extension line of each data record track or on a line parallel to it. At least two tracking position indication marks may be provided on the line so as to be spaced from each other.

In a typical example of the marks, both may be provided on the outside of the starting point and the end point of each data record track, respectively. In the optical recording medium which provides the clock marks on the line parallel to the respective data record tracks, the tracking position indication marks may be provided at opposite ends of the clock mark lines, respectively. In this case, a plurality of clock mark lines may be provided for each of the data recording tracks or one or more clock mark line may be provided commonly for all or some of the data record tracks. Alternatively, an additional line which sets only the tracking position indication marks may be specially provided on the line as described above.

OPERATION

With the arrangement as described above, the home position setting mark determines the reference position for the previously described data record tracks, for example the reference of the initial position for writing data. The data record track access can be performed rapidly by this. When the clock mark line or lines are provided, they can also be reference positions for said line or lines. When the tracking position indication marks to detect the tracking state are provided, they may also function as references for the marks.

If track position marks are provided on the home position setting mark, they may be utilized for the detection of the positions of the respective tracks so that it can be used as a guide when performing random access of data.

The detection of the track position by the track position marks is carried out, for example, by a track position mark detection sensor, a clock mark detection sensor, a read head sensor or other sensors while being moved along the home position setting mark to sequentially detect the track position marks by counting the number of detections. Therefore, if the track number is assigned so that it may correspond to the number of detections, random access is possible for data read/write operations by specifying the track number.

PREFERRED EMBODIMENTS OF THE INVENTION

Preferred forms of the optical recording medium embodying the present invention will now be described.

(Configuration of the First Embodiment)

Figure 1:
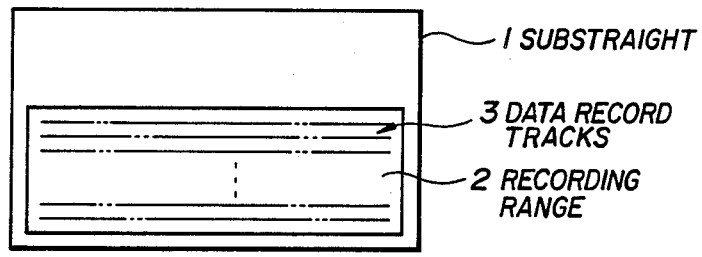
FIG. 1 is a plan view which shows a first form of an optical recording medium embodying the present invention.
Figure 2:
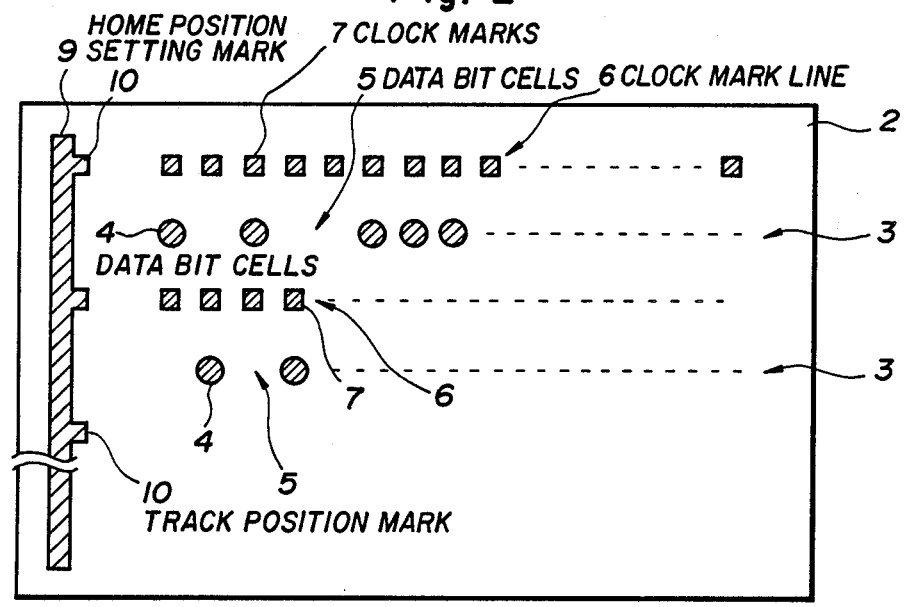
FIG. 2 is an enlargement of the principal portion of the optical recording medium of FIG. 1.

FIG. 1 illustrates a configuration of a first embodiment of the optical recording medium according to the present invention. An enlarged diagram is shown in FIG. 2.

This embodiment is an application to optical memory in a card form which is configured to provide a recording range 2 in the main surface of the substrate 1 in the card form, and to juxtapose the data record tracks 3 in the recording range 2 at fixed intervals as shown in FIG. 1. FIG. 2 is referred to for a detailed explanation of each configuration component in this embodiment.

In the data record track 3, data bit cells 4 are formed according to the data code to be written. If it is digital information, data is written as a digital value of "1" or "0" corresponding to the presence of the cell 4.

The writing of data is made in such a way that a data bit cell 4 may be provided by forming a predetermined optical change state. For example, the surface condition is changed by locally melting relevant portions of the data recording track 3 by the irradiation of a laser beam spot, and the data bit cell 4 is formed as a portion in which the reflectivity is different from those of the other portions 5 (where no cell 4 is formed).

In this embodiment, clock mark lines 6 are arranged so as to be adjoined to the respective data record tracks 3. In each of the clock mark lines 6, a plurality of clock marks 7 are provided at predetermined intervals. Each individual mark 7 is configured in a unified and fixed optical pattern and is arranged at fixed intervals. The writing of clock mark 7 can be performed at the same time as the data writing to the previously described data record track 3, but in this embodiment it is formed at the same time that the recording range 2 is formed by photolithographic techniques.

A home position setting mark 9 is located at an end side portion of the recording range 2, so as to be perpendicular to the data record tracks 3 and clock mark lines 6. In this embodiment, the home position setting mark 9 provides a belt strip, where track position marks 10 are attached as projections in the positions which correspond to the previously described clock mark lines 6, respectively. These marks 9 and 10 may be formed in a way similar to that of the previously described clock mark 7, for example, by photolithographic techniques, and in this embodiment, they are formed simultaneously with the formation of the clock marks 7.

(Operation of the First Embodiment)

Referring to FIGS. 1 and 2 as referred to above and FIG. 3, the random access operations of this embodiment will now be described.

In the execution of random access operations, a sensor for detecting the clock marks 7 and the track position marks is provided in a read/write head (not shown). In this embodiment, the sensor comprises a sensor block Sb, which is composed of three photodetectors S1, S2, and S3 that are arranged along the width of clock mark line 6 as shown in FIG. 3.

The random access operations will now be described referring to data reading.

First, the initial position setting for the read/write head is performed, and then the read/write head and the optical recording medium are moved relatively with respect to each other to locate the read/write head at the home position of the recording range 2. Then, this head is moved slightly along the width of the data record track. In the meantime, if the previously described sensor block Sb, comprised of the photodetectors S1, S2, and S3, continuously detect the same optical conditions for the home position setting mark 9, the positioning of the head at the home position can be verified.

The read/write head is then relatively moved slightly towards the center of the length of the recording range 2 and is stoped when the visual field of the photodetectors S1, S2 and S3 of the previously described sensor block Sb is separated from the home position setting mark 9. Next, there is a relative motion of the head parallel to the width of the data record track 3. After this operation, the photodetectors S1, S2 and S3 of the previously described sensor block Sb detect the track position mark 10 sequentially. The data record track position can be determined by counting the number of these detections.

If the track number is allocated to correspond to the number of detections, the random access of data is possible by specifying the track number.

The determination of the position for the appropriate track of the read head can be performed by using the track position marks 10. For example, in the series of photodetectors S1, S2 and S3 of the previously described sensor block Sb, when only photodetector S2 detects the track position mark 10 and the other photodetectors S1 and S3 do not detect it, the sensor block Sb motion is stopped.

The previously described random access operations are exactly the same when data is written. The data record track to which data is to be written can be detected easily by the sensor block Sb by calculating track position marks 10.

In this manner, when the track to be accessed is detected in this embodiment, it can be detected mechanically by the hardware without reading the data written in the track. This enables rapid access.

The following explanation describes how data is read from a specified data track 3 after the track 3 has been detected.

The head is first relatively moved parallel to the data record track 3 t detect the first clock mark 7 at the edge of clock mark line 6. This detection is performed by the photodetectors S1, S2 and S3 in the previously described sensor block Sb. If S2 detects this clock mark 7 and the other photodetectors S1 and S3 do not detect it, it is determined to be in the normal tracking condition and the read head reads the data bit cells 4, that correspond to the clock marks, respectively from the data record track 3 to read the data.

Thereafter, the read head reads the data while relatively moving along the data record track 3. Since the reading of each track is performed by using the clock marks as synchronous signals, read errors are not produced, even if there are speed variations in the relative motion of the head.

When the read head moves, none of the photodetectors S1, S2 or S3 detect the clock mark 7 in the interval between one clock mark 7 and the next clock mark 7. At this time, the countermeasure processing sets the deferment of the decision, and even after this set time has passed, if clock mark 7 is not detected, it determines that the field of vision of the sensor block Sb is separated from the clock mark 6, sets a time-out error, stops the reading and performs an alignment adjustment to correct the relative positioning of the read head and an optical memory guide.

If the clock mark 7 is not detected by the photodetector S2 and detected by the other photodetector S1 or S3, this is evaluated as a tracking error, and the previously described error processing is performed.

The write operations are explained next.

In the above-mentioned read operations, a head checking operation is performed while the read operation is being performed, but for a write operation, first an alignment adjustment is performed and then the write operation takes place. The write head is relatively moved in parallel with the length of the data record track which is to be written to, and the alignment adjustment is performed so that the sensor block may make the normal detection of the clock mark 7 as previously described.

After this, in the same manner as the previously described read operation, the write operation is performed while carrying out the checking operation of the tracking error and time-out error. If a tracking error or time-out error is detected at this time, processing is performed to invalidate the entire track, which differs from the read operation. For example, it is invalidated by writing a predesignated, special discrimination symbol. If a recording medium is a type which allows rewrite operations, this invalidation processing is not always necessary, and the rewriting into the appropriate data record track would be performed after the alignment adjustment.

(Configuration of the Second Embodiment)

Figure 4:
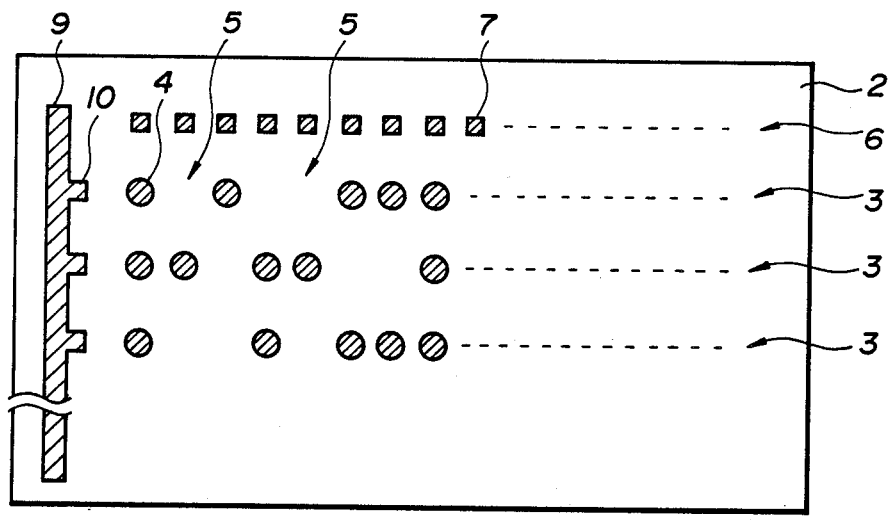
FIG. 4 is an enlarged plan view which shows the configuration of a second form of an optical recording medium embodying the present invention.

FIG. 4 is an enlarged diagram illustrating the configuration of a second form of the optical recording medium embodying the present invention.

This embodiment is applied to a card type optical memory as in the previously described first embodiment, but the configuration differs from the previously described first embodiment, in that this invention is applied to the arrangement of the clock mark line 6 which is provided in common with all the data record tracks 3, as shown in FIG. 4.

This embodiment arranges the home position setting mark 9 that sets the reference position for each of the previously described data tracks 3, and also sets the track position marks 10 indicative of the track positions at the positions corresponding to the respective data recording tracks.

This home position setting mark 9 is configured substantially the same as for the previously described first embodiment. The track position marks 10, excepting the fact that its arrangement density is different, have the same configuration as the previously described first embodiment.

In the interval between each data record track 3 in this embodiment, the data record tracks 3 are arranged at a higher density than in the previously described first embodiment, without arranging the clock mark line, and the recording capacity is thus increased.

(Operation of the Second Embodiment)

Referring now to FIG. 4, the random access operations in this embodiment, as described above will now be given.

Figure 3:
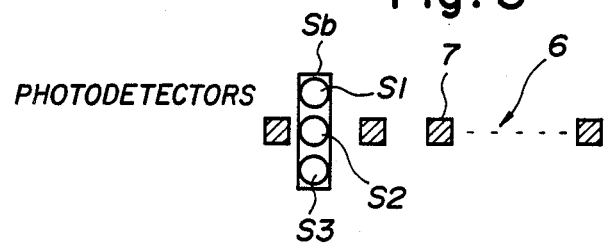
FIG. 3 shows a relationship between clock marks and detection sensors.

The random access operation in this embodiment uses a sensor block Sb exclusively for the track position mark detection, which arranges three photodetectors S1, S2 and S3 along the width of the clock mark line 6 as in the sensor Sb shown in FIG. 3. This sensor block is attached to the read/write head (not shown in the figure) and follows the head as it moves.

This embodiment uses another sensor block to detect the clock mark 7, which is similar to the sensor block for detecting the track position marks. However, this sensor block is independent of the read/write head (not shown in the figure), and does not follow the motion of the head data record track 3 in a direction perpendicular to the data record tracks 3, and only follows the motion in the data record track direction.

In this embodiment, the home position setting mark 9 is first detected by the track position mark detection sensor in substantially the same manner as the initial position setting in the first embodiment, and then the track position marks 10 are detected. After that, any desired track position mark 10 is accessed as in the foregoing first embodiment.

This operation differs from the first embodiment, in that the position of the clock mark line is detected by the track position mark in the previously described first embodiment, but in this embodiment the data record track position is detected directly by the track position mark 10.

Thus, in this embodiment, the random access of the data record track can also be performed as in the previously described first embodiment.

In this embodiment, the tracking error is detected and the alignment adjustment is performed using the commonly provided clock mark line. In this case, the tracking error detection can be performed either before the data is read or while the data is being read. In this embodiment, each clock mark 7 of the clock mark line 6 is used as a synchronizing signal.

Next, in the data writing is similar to the tracking errors detection and the alignment adjustment have been performed before the data is read, and if a tracking error is detected during the write operation, the write data for this data record track is invalidated. The other operations are performed in the same manner as for the previously described read operation. Even if a tracking error is detected during a write operation, if the recording media is of rewritable type, this invalidation processing is not always necessary as in the previously described first embodiment.

(Configuration of the third embodiment)

Figure 5:
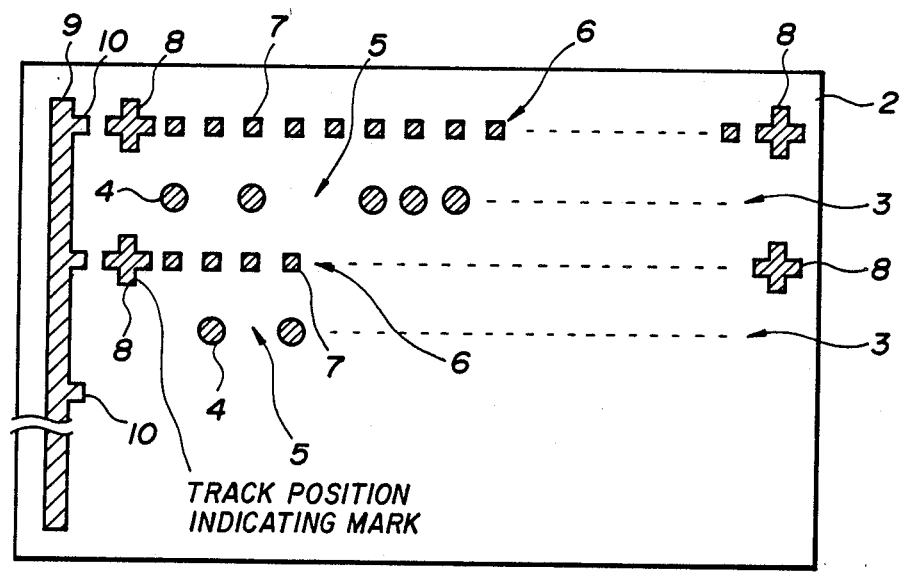
FIG. 5 is an enlargement of a third form of an optical recording medium embodying the present invention.

FIG. 5 illustrates the configuration of a third form of the optical recording medium embodying the present invention.

This embodiment is applied to a card type optical recording medium as shown in FIG. 1 as in the foregoing first and second embodiment, and is equipped with recording range 3 on the main surface of the card type substrate 1, and is configured to arrange a plurality of data record tracks 3 in this record range 2 at uniform intervals. In this embodiment, the remaining configuration is basically the same as in the previously described first embodiment except for the tracking position indication marks. Therefore, FIG. 5 is now referred to for a detailed explanation of the difference between this embodiment and the first embodiment.

The tracking position indication marks 8 are located at the beginning edge and the end edge of each clock mark line 6 disposed between any two adjacent data record tracks 3. Each of the tracking position indication marks 8 is formed in the shape of a cross, and the part that crosses is selected so that it has a size of the previously described clock mark 7. The length of the tracking position indication mark 8 in the direction of the clock mark line 6 is set so it can be easily distinguished from the cross mark 7. The length in a direction perpendicular to the clock mark line 6 of the tracking position indication mark 8, is set to enable the determination of whether the tracking of the clock mark line 6 can be performed correctly or not. In this embodiment, these perpendicular lengths of the tracking position indication marks 8 are set so that the marks 8 may have in each direction up and down, and left and right, an additional length corresponding to each clock mark 7. horizontally and vertically in each direction to the approximate length of the clock mark 7.

This tracking position indication marks 8 may be formed by photolithographic techniques etc. as for the clock marks 7, and they are formed simultaneously with the clock mark 7 in this embodiment.

(Operation of the third Embodiment)

Figure 6:
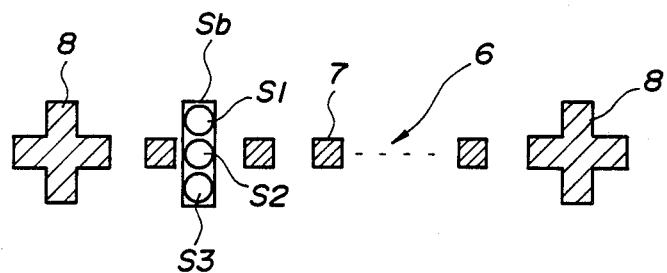
FIG. 6 is a diagram which shows a relation between tracking position indication marks, clock marks and their detection sensors.
Figure 7:
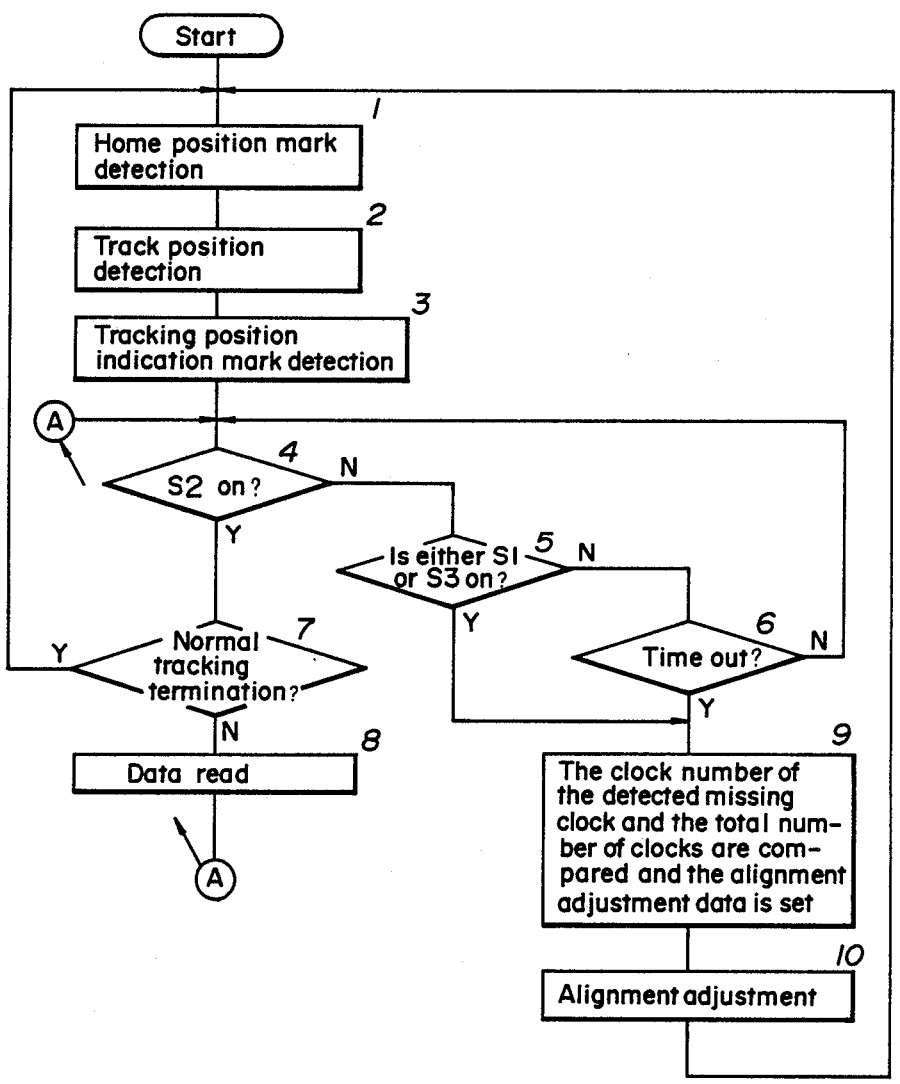
FIG. 7 is a flowchart which shows the operation of data reading.

Referring to FIG. 5, FIG. 6 and FIG. 7, an explanation of the operation of the third embodiment as described above will now be given.

In this embodiment, the operation to read data from the optical recording medium in card format uses a read/write head (not shown in the figure), but a special sensor is used for random access and tracking operations. The sensor to be used to detect the tracking position indication marks 8 and clock marks 7 in this embodiment may be a sensor block Sb, which is formed from the arrangement of photodetectors S1, S2 and S3 as shown in FIG. 6. The sensors is attached to the read/write head. This sensor may be configured substantially the same as that used in the first embodiment.

To read data, the initial position setting for the read/write head is performed first. The read/write head is relatively moved with respect to the optical recording medium, and the read/write head is located above the home position in the recording range 2, which is indicated by the home position setting mark 9. Then, this head is moved slightly in a direction parallel to the width of the data record track 3. In the meantime, if each sensor S1, S2 and S3 in the aforementioned sensor block Sb, continuously detects a predetermined optical state corresponding to the optical state of the home position setting mark 9, it can be confirmed that the read/write head is located at the home position (Step 1 of FIG. 7).

The read/write head is then moved slightly towards the center of the length of the recording range 2 and is stopped when the visual field of the photodetectors S1, S2 and S3 of the previously described sensor block Sb is separated from the home position setting mark 9. Next, there is a relative motion of the head parallel to the width of the data record track 3. After this operation, the photodetectors S1, S2 and S3 of the previously described sensor block Sb detect the track position marks 10 sequentially. The data record track position can be determined by counting the number of these detections (Step 2).

Accordingly, if the track number and the number of the detections correspond, the random access of data can be performed by specifying the track number.

The following explanation describes how data is read from a specified data record track 3 after it has been detected.

The head is first moved towards the center of the data record track 3 in parallel with the data record track 3 to detect the first tracking position indication mark 8 (Step 3) at the beginning edge of the clock mark line 6. This detection is performed by each photodetector S1, S2 and S3 in the sensor block Sb as mentioned above. This detection is effected when any of the photodetectors detect a fixed-length optical condition that corresponds to the optical condition of a tracking position indication mark 8 as the head moves.

If the tracking position indication mark 8 is detected, the read/write head is moved relatively in the direction of the width of the data record track 3, to enable the detection of the tracking position indication mark 8 at the same time, by each photodetector S1, S2 and S3 in the aborementioned sensor block Sb.

After this operation, the read/write head is moved parallel to the data record track 3, and performs the following processing until another tracking position indication mark 8 that is located in the same clock mark line 6 is detected.

TABLE 1

| States of Photodetectors | | | |
|---|---|---|---|
| S1 | S2 | S3 | Processing |
| OFF | OFF | OFF | Waits until S2 is on. (Time-out sensor) |
| OFF | OFF | ON | Card alignment adjustment |
| OFF | OFF | ON | Data read of the card |
| OFF | ON | OFF | |
| ON | ON | OFF | |
| ON | OFF | OFF | Card alignment adjustment |
| ON | ON | ON | Normal tracking termination |

The following processing operations will be detected according to the condition of each of the photodetectors, S1, S2 and S3 in the sensor block S3, as shown in Table 1.

a. Data read/write operation
b. Normal tracking termination
c. Abnormal tracking termination When the read/write head reads data, the photodetector S2 of the sensor block Sb is checked to determine whether it is on or off, and if it is on, this verifies the fact that the tracking is normal (Step 4), and processing advances to Step 7. If the photodetector is off, processing advances to Step 5.

Step 5 checks if either of the other sensors S1 or S3 is on or not. If neither of the sensors is on, the processing advances to Step 6 because the sensor block Sb does not reach the clock mark position which should be detected. If either of the photodetectors S1 or S3 is on, this is determined to be a tracking error, and the processing advances to Step 9.

Step 6 repeats the decisions made in the above mentioned Steps 4 and 5 and then waits for a predesignated period of time. This waiting time is set according to the number of repetitions for the loop of Steps 4, 5 and 6. This number is set according to the relative motion speed of the sensor block Sb and the arrangement intervals of the clock marks. If photodetector S2 goes on before this waiting period elapses, processing advances to Step 7, but if either photodetector S1 or S3 goes on, this is regarded as a tracking error and processing advances to Step 9. When the waiting time has elapsed, this is regarded as a time-out error and processing advances to Step 9.

In the normal tracking, all the photodetectors S1, S2 and S3 in the sensor block Sb are checked to determine whether they are on or not in Step 7. If they are all on, processing returns to Step 1 to determine the tracking position indication mark 8 at the end edge of the clock mark 6 has been detected. If only the S2 photodetector is on, a data read operation is performed (Step 8) and processing returns to Step 4, and the detection of the next clock mark 7 is performed.

The detection of the data read termination for one data record track can also be performed by calculating the number of clock marks.

At this point, the above mentioned Steps 4, 5 and 7 can be performed at the same time by a logical judgement of the output condition of each photodetector, S1, S2 and S3. This logical judgement can be performed by the detection of the output condition patterns of each photodetector S1, S2 and S3 which are shown in the above mentioned Table 1.

When there is a tracking error or timing error, the clock-missing processing is performed (Step 9). The alignment adjustment data is set based on the ratio of the number of clock marks detected in this clock mark line and the total number of clock marks. The relative inclination of the optical memory card and the read head is corrected according to this alignment adjustment data, and the alignment adjustment (Step 10) is performed. After this, processing returns to Step 1 and the data read operation is performed by the same procedures as described above.

The write operation is explained next.

In the case of the above-mentioned read operation, the tracking check is performed during the read operation, but in the case of the write operation, the alignment adjustment is performed first and then the write operation is performed. The read/write head is moved along the data record track which is to be written to and the alignment adjustment is performed to enable the tracking position indication marks 8 on both ends of the corresponding clock mark 6 to be detected, by the sensor block Sb.

After this, the write operation is performed during the checking of the tracking error and time-out error by the aforementioned read operation. When a tracking error or time-out error has been detected, the track invalidation processing is performed which is different than the data read operation. For example, it is invalidated by writing a predesignated special discrimination mark. If the optical recording medium is a type which allows rewrite operations, this invalidation processing is not always necessary and the data should be written again to the data record track after the alignment adjustment. If the data recording track has clock mark lines and the clock marks are arranged in uniform intervals, the read/write head can receive the correct timing for the data read/write operations, even if there is a fluctuation in the relative motion speed of the read head and the optical recording medium when data read/write operations are performed.

(Other Embodiments)

Figure 8:
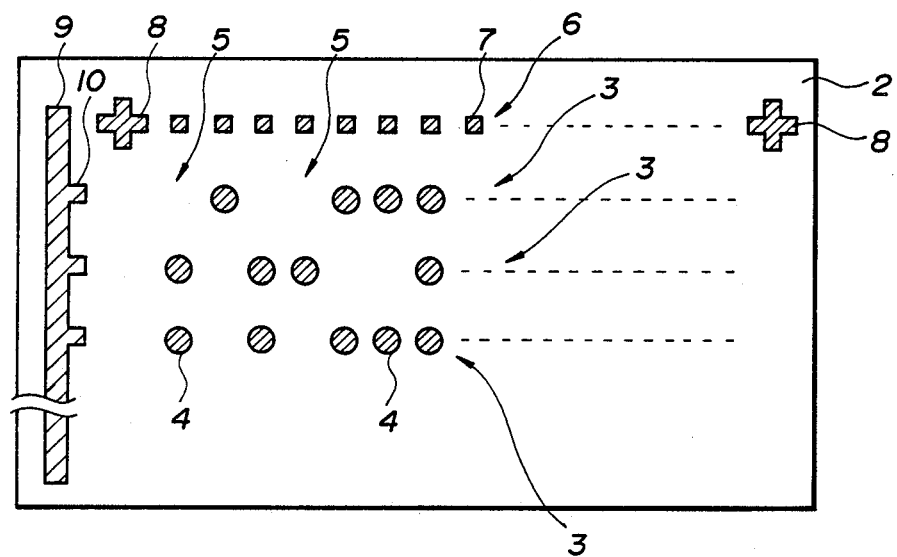
FIGS. 8 to 10 are enlargements of principal portions of the configuration of fourth to sixth embodiments.
Figure 9:
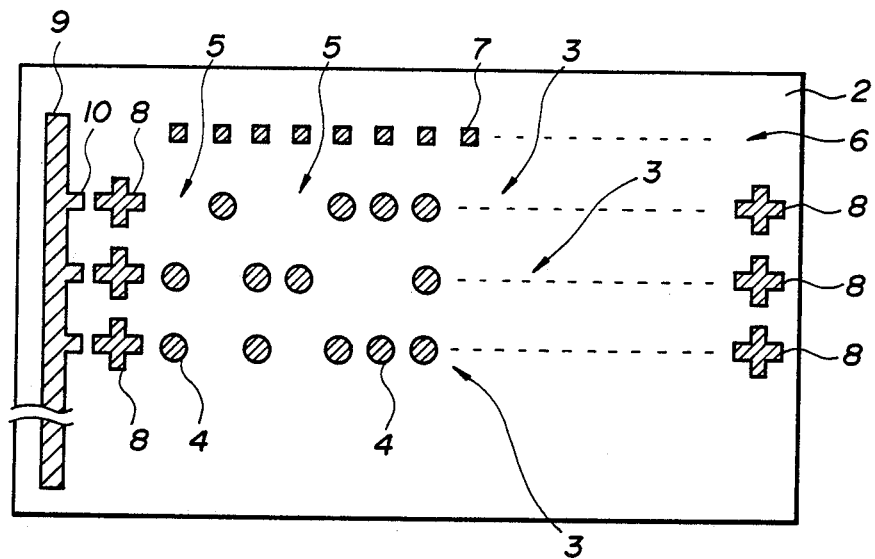
Figure 10:
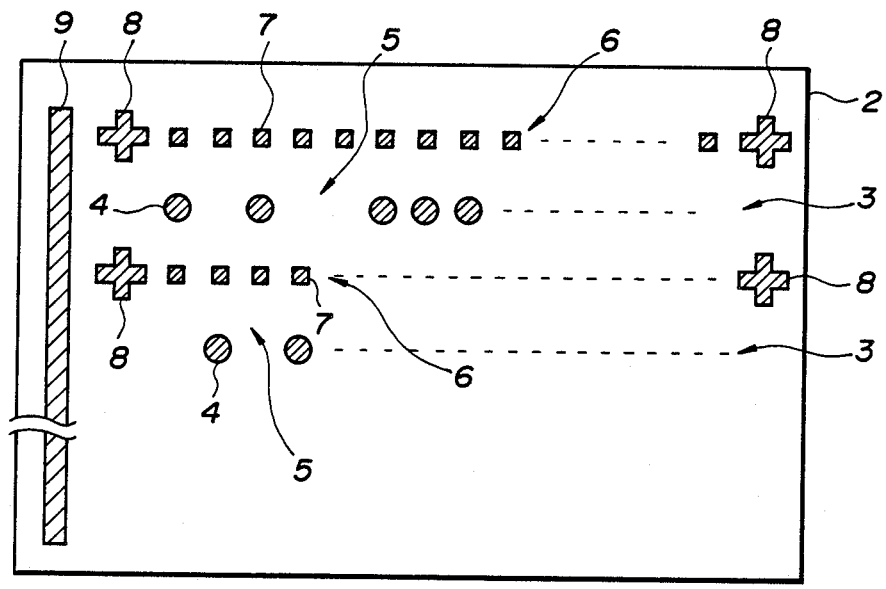

Fourth to sixth embodiments of this invention are illustrated in FIG. 8 to FIG. 10.

The fourth embodiment illustrated in FIG. 8 is an embodiment in a clock mark line 6 and tracking position indication mark 8 are provided in common with the entire data record track 3, as different from the third embodiment in which they are provided for every data record track. Except for this difference, the structure of the data record in this embodiment is substantially the same as for the previously described third embodiment.

According to this embodiment, the clock mark line 6 is commonly used and an area which would otherwise needed for the clock mark lines 6 are decreased, and this enables the high density arrangement of the data record track.

In this embodiment of the optical recording medium, not only the clock mark sensor but another sensor for a random access sensor should be provided for the read/write operation. The read/write head can also be used as the random access sensor. The read/write head and the clock sensor should cancel the connection therebetween when the read/write head moves between the data record tracks.

In the fifth embodiment, as illustrated in FIG. 9, the data record track 3 has tracking position indication marks 8 at both ends thereof, and a clock mark 6 is provided in common with all the data record tracks 3. The other configuration is substantially the same as the previously described third embodiment, except for the difference in arrangement as specified above.

In this embodiment, since the clock mark line 6 is provided in common with the clock mark line 6, the range which would otherwise be necessitated for the lines 6 can be decreased and the data record tracks can be arranged in the saved range with a high-density.

The optical recording medium in this embodiment needs a tracking sensor (which may also be used as a random access sensor) as well as the clock mark sensor in order to perform read/write operations. The read/write head can be used as these sensors.

In the sixth embodiment illustrated in FIG. 10, the tracking position indication marks have been removed from the previously, described third embodiment. The other configuration is the same as the above-mentioned third embodiment except for this difference. The above-mentioned fourth embodiment and fifth embodiment are also possible in this mode.

In this embodiment, it is difficult to detect the target track correctly by using random access in the initial position setting since the tracking position indication marks 8 are removed. However, random access of the track can be performed by calculating the tracking position indication mark 8 after checking for a tracking error or after performing an alignment adjustment.

This invention can be applied to a variety of modes and is not exclusively limited to the applications shown in each of the above-mentioned first to sixth embodiments. For example, variations or modifications of previously described embodiments will be described.

The tracking position indication mark is shaped like a cross in the above-mentioned embodiments of FIGS. 3 to 6, but this invention is not only limited to this mode, but can actually be used in any number of forms if the sensors can distinguish the mark in the directions of both the length and width. For example, the case where the crossing portion of the cross may be omitted.

In each of the above-mentioned embodiments, the position of the tracking position indication marks are provided at both ends of the data record track or the clock mark line, but can be located at another position or more than three positions away. For example, only the tracking position indication mark can be configured on a line parallel to the data record track.

Each of the above-mentioned embodiments has a home position setting mark located at the end side of the record range length, but this invention is not limited to this location, and the mark can be located at the most appropriate position in the middle or at either end. The tracking position indication mark can be located together with the home position setting mark.

Furthermore, in the above-mentioned second, fourth and fifth embodiments, the track position marks are provided in the form of geometric projections on the home position setting mark, but they may be formed in geometric concave shapes. In this case, the detection pattern of each of the photodetectors is inverted from that of the previously described embodiments.

What is claimed is:

1. An optical recording medium of a type having a plurality of data record tracks containing data record cells and juxtaposed within a recording region of the medium, predetermined spaces provided between the respective tracks, which medium comprises at least one home position setting mark elongated in a direction perpendicular to the direction of said tracks and having track position marks extending from said home position setting mark for setting reference positions for said tracks, and track position indicating marks larger than said data record cells at extensions of opposite ends respectively of at least one of said data record tracks or a line parallel therewith and indicative of an effective tracking position of said at least one track.

2. An optical recording medium as claimed in claim 1, which further comprises;
    clock mark lines each having clock marks arranged at predetermined intervals, which lines are provided adjacently to the respective data record tracks so as to extend therealong; and
    said home position setting mark also functioning as references for the respective clock mark lines;
    track position marks indicative of the positions of the tracks, which are provided on said home position setting mark at positions corresponding to the respective clock mark lines.

3. An optical recording medium as claimed in claim 1, which further comprises a clock mark line having clock marks disposed at predetermined intervals, said clock mark line being provided in common for said data record tracks.

4. An optical recording medium as claimed in claim 1, in which said tracking position indication marks are formed in a cross-shape.

5. An optical recording medium of a type having a plurality of data record tracks juxtaposed within a recording region of the medium, having predetermined spaces between the respective tracks, which medium comprises at least one home position setting mark elongated in a direction perpendicular to the direction of said tracks, at least one clock mark line having clock marks arranged parallel with an adjacent data record track, track position marks extending from said home position setting mark for setting reference positions for said at least one clock mark line, and track position indicating marks larger than said clock marks at opposite ends of said at least one clock mark line.

6. An optical recording medium as claimed in claim 5, in which said tracking position indication marks are formed in a cross-shape.

7. An optical recording medium of a type having a plurality of data record tracks juxtaposed within a recording region of the medium, having predetermined spaces between the respective tracks, which medium comprises at least one home position setting mark elongated in a direction perpendicular to the direction of said tracks, at least one clock mark line having clock marks arranged parallel with an adjacent data record track, track position marks extending from said home position setting mark for setting reference positions for said at least one data record data track, and track position indicating marks larger than said clock marks at opposite ends of said at least one clock mark line.

8. An optical recording medium as claimed in claim 7, in which said tracking position indication marks are formed in a cross-shape.

9. An optical recording medium as claimed in claim 8, wherein a plurality of data record tracks share a common clock mark line.

10. An optical recording medium as claimed in claim 7, wherein a plurality of data record tracks share a common clock mark line.

* * * * *